(12) United States Patent
Kumar et al.

(10) Patent No.: US 11,711,779 B2
(45) Date of Patent: Jul. 25, 2023

(54) METHOD AND UE FOR TRIGGERING REGISTRATION PROCEDURE WITHIN REGISTRATION AREA OF WIRELESS COMMUNICATION NETWORK

(71) Applicant: Samsung Electronics Co., Ltd., Suwon-si (KR)

(72) Inventors: Lalith Kumar, Karnataka (IN); Shweta Madhurapantula, Karnataka (IN); Nitesh Pushpak Shah, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/594,694

(22) Filed: Oct. 7, 2019

(65) Prior Publication Data

US 2020/0112938 A1    Apr. 9, 2020

(30) Foreign Application Priority Data

Oct. 5, 2018   (IN) .............................. 201841037873
Sep. 25, 2019  (IN) .............................. 2018 41037873

(51) Int. Cl.
*H04W 48/16*   (2009.01)
*H04W 60/04*   (2009.01)
(Continued)

(52) U.S. Cl.
CPC ........... *H04W 60/04* (2013.01); *H04W 4/029* (2018.02); *H04W 48/16* (2013.01); *H04W 76/11* (2018.02); *H04W 76/27* (2018.02); *H04W 84/042* (2013.01)

(58) Field of Classification Search
CPC ..... H04W 84/042; H04W 60/06; H04W 8/02; H04W 76/30; H04W 76/27; H04W 76/32;
(Continued)

(56) References Cited

U.S. PATENT DOCUMENTS

2014/0206352 A1*  7/2014  Mochizuki ............ H04W 60/04
                                              455/435.1
2014/0295837 A1  10/2014  Madasamy
(Continued)

FOREIGN PATENT DOCUMENTS

WO    2017/018838 A1    2/2017
WO    2018-008944 A1    1/2018
(Continued)

OTHER PUBLICATIONS

3GPP ETSI TS 124 501 V15.0.0 (Jul. 2018) 5G Non-Access-Stratum (NAS) protocol for 5G System (5GS) stage 3.*
(Continued)

*Primary Examiner* — Joseph Arevalo
(74) *Attorney, Agent, or Firm* — Jefferson IP Law, LLP

(57) ABSTRACT

A method for triggering a registration procedure by a UE within a registration area of a wireless communication network is provided. The method includes receiving a TAI list in a registration accept message while performing a first registration procedure with the wireless communication network and determining when the UE is moved from a first cell in a first TAI belonging to a first PLMN to a second cell in a second TAI belonging to a second PLMN, determining that the UE is in an RRC inactive state, and automatically triggering a second registration procedure with the wireless communication network, in response to determining that the UE is moved from first cell in first TAI belonging to first PLMN to second cell in second TAI belonging to second PLMN.

20 Claims, 8 Drawing Sheets

(51) Int. Cl.
*H04W 4/029* (2018.01)
*H04W 76/11* (2018.01)
*H04W 76/27* (2018.01)
*H04W 84/04* (2009.01)

(58) Field of Classification Search
CPC ....... H04W 8/20; H04W 48/06; H04W 48/16; H04W 88/14; H04W 8/08; H04W 12/06; H04W 36/0022; H04W 48/08; H04W 48/12; H04W 4/02; H04W 4/14; H04W 72/0413; H04W 72/0433; H04W 76/11; H04W 76/12; H04W 80/08; H04W 88/085; H04W 88/10; H04W 8/22; H04W 16/02; H04W 60/005; H04W 76/28; H04W 84/12; H04W 88/023; H04W 88/06; H04W 8/065; H04W 12/0051; H04W 12/08; H04W 28/06; H04W 28/16; H04W 40/20; H04W 40/36; H04W 48/02; H04W 48/17; H04W 4/029; H04W 74/08; H04W 76/22; H04W 76/25; H04W 76/50; H04W 80/02; H04W 8/26
USPC .... 455/418, 434, 416, 432.1, 458, 450, 522, 455/562.1, 456.3, 435.1, 456.1, 525, 455/550.1, 414.1, 68, 452.1, 455, 436, 455/411, 404.1; 370/331, 329, 401, 328, 370/341, 352, 390
See application file for complete search history.

(56) References Cited

U.S. PATENT DOCUMENTS

| | | | |
|---|---|---|---|
| 2014/0355417 A1 | 12/2014 | Kim et al. | |
| 2015/0092579 A1* | 4/2015 | Li | H04W 24/10 |
| | | | 370/252 |
| 2015/0351023 A1 | 12/2015 | Basavaraj et al. | |
| 2018/0220289 A1 | 8/2018 | Ryu et al. | |
| 2018/0270791 A1* | 9/2018 | Park | H04W 8/24 |
| 2018/0270894 A1* | 9/2018 | Park | H04W 76/27 |
| 2018/0279229 A1* | 9/2018 | Dinan | H04W 52/146 |
| 2019/0021064 A1 | 1/2019 | Ryu et al. | |
| 2019/0029065 A1* | 1/2019 | Park | H04W 4/16 |
| 2019/0037516 A1 | 1/2019 | Kim et al. | |
| 2019/0150221 A1* | 5/2019 | Tseng | H04W 36/0055 |
| | | | 370/331 |
| 2019/0174449 A1* | 6/2019 | Shan | H04W 60/00 |
| 2019/0335392 A1* | 10/2019 | Qiao | H04W 76/27 |
| 2019/0342821 A1* | 11/2019 | Kim | H04W 76/18 |
| 2019/0373441 A1* | 12/2019 | Ryu | H04W 60/04 |
| 2019/0380128 A1* | 12/2019 | Park | H04W 48/10 |
| 2020/0128420 A1 | 4/2020 | Ryu | |
| 2020/0267539 A1* | 8/2020 | Tamura | H04W 48/20 |
| 2020/0329455 A1* | 10/2020 | Ryu | H04W 76/27 |

FOREIGN PATENT DOCUMENTS

| | | | |
|---|---|---|---|
| WO | 2018/088836 A1 | 5/2018 | |
| WO | 2018/169281 A1 | 9/2018 | |

OTHER PUBLICATIONS

International Search Report dated Jan. 21, 2020; International Appln. No. PCT/KR2019/013144.
Qualcomm Incorporated; Selection of PLMM ID for use in authentication after a transition to 5GMM-CONNECTED mode with RRC inactive indication to 5GMM-CONNECTED mode in an equivalent PLMN; 3GPP TSG-CT WG1 Meeting #112bis; C1-186353; Oct. 15-19, 2018; Vilnius (Lithuania).
Samsung; Discussion on selecting EPLMN in RRC_Inactive state; 3GPP TST-CT WG1 Meeting #112bis; C1-186504; Oct. 15-19, 2018; Vilnius (Lithuania).
Samsung et al.; UE-AMF selected PLMN ID mismatch in INACTIVE state; 3GPP TSG-CT WG1 Meeting #113; C1-188534; Nov. 26-30, 2018; West Palm Beach, FL.
Indian Office Action dated Feb. 15, 2021, issued in a counterpart an Indian Application No. 201841037873.
"3rd Generation Partnership Project; Technical Specification Group Core Network and Terminals; Non-Access-Stratum (NAS) protocol for 5G System (5GS); Stage 3 (Release 15)", 3GPP TS 24.501, V15.1.0, 21 XP051487109, Sep. 21, 2018.
European Search Report dated Nov. 19, 2021, issued in European Application No. 19868722.0.

* cited by examiner

METHOD AND UE FOR TRIGGERING REGISTRATION PROCEDURE WITHIN REGISTRATION AREA OF WIRELESS COMMUNICATION NETWORK

CROSS-REFERENCE TO RELATED APPLICATION(S)

This application is based on and claims priority under 35 U.S.C. § 119(a) of an Indian provisional patent application number 201841037873, filed on Oct. 5, 2018, and of an Indian complete patent application number 201841037873, filed on Sep. 25, 2019, in the Indian Intellectual Property Office, the disclosure of each of which is incorporated by reference herein in its entirety.

BACKGROUND

1. Field

The disclosure relates to wireless communication, and more particularly, to a method and user equipment (UE) for triggering registration procedure within a registration area of a wireless communication network.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter Wave (mmWave) bands, e.g., 60 gigahertz (GHz) bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large-scale antenna techniques are discussed with regard to 5G communication systems. In addition, in 5G communication systems, development for system network improvement is ongoing based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have been developed.

With regard to other technologies, the Internet, which is a human centered connectivity network where humans generate and consume information, is now evolving into the Internet of Things (IoT) where distributed entities, such as things, exchange and process information without human intervention. The Internet of Everything (IoE), which is a combination of the IoT technology and Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth, have been recently researched. Such an IoT environment may provide intelligent Internet technology services that create new value to human life by collecting and analyzing data generated among connected things. Such IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for triggering a registration procedure by a UE within a registration area of a wireless communication network.

Another aspect of the disclosure is to receive a tracking area identifier (TAI) list in a registration accept message while performing a first registration procedure with the wireless communication network, where the TAI list indicates a registration area of the wireless communication network.

Another aspect of the disclosure is to determine when the UE is moved from a first cell in a first TAI belonging to a first public land mobile network (PLMN) to a second cell in a second TAI belonging to a second PLMN.

Another aspect of the disclosure is to automatically trigger a second registration procedure with the wireless communication network in response to determining that the UE is moved from the first PLMN to the second PLMN in 5GMM connected mode with RRC inactive state.

Another aspect of the disclosure is to register with the wireless communication network by sending a second registration request message to the wireless communication network.

Additional aspects will be set forth in part in the description which follows and, in part, will be apparent from the description, or may be learned by practice of the presented embodiments.

In accordance with an aspect of the disclosure, a method for triggering a registration procedure by a UE within a registration area of a wireless communication network is provided. The method includes receiving a tracking area identifier (TAI) list in a registration accept message while performing a first registration procedure with the wireless communication network, where the TAI list indicates a registration area of the wireless communication network and where the TAI list comprises a plurality of PLMN identifiers (IDs).

In accordance with another aspect of the disclosure, the method further includes determining when the UE is moved from a first cell in a first TAI belonging to a first PLMN to a second cell in a second TAI belonging to a second PLMN.

In accordance with another aspect of the disclosure, the method further includes determining when the UE is in an RRC inactive state and automatically triggering a second registration procedure with the wireless communication network in response to determining that the UE is moved from the first cell in the first TAI belonging to the first PLMN to the second cell in the second TAI belonging to the second PLMN and registering with the wireless communication network by sending a second registration request message to the wireless communication network.

In accordance with another aspect of the disclosure, the second PLMN is an equivalent PLMN.

In accordance with another aspect of the disclosure, the first PLMN cell and second PLMN cell are the shared network cell.

In accordance with another aspect of the disclosure, the registration procedure is triggered by a non-access stratum (NAS) layer of the UE when an access stratum (AS) layer indicates that the UE is moved from the first cell in the first TAI belonging to the first PLMN to the second cell in the second TAI belonging to the second PLMN.

In accordance with another aspect of the disclosure, a user equipment (UE) for triggering a registration procedure within a registration area of a wireless communication network is provided. The UE includes a memory and at least one processor coupled to the memory. The processor is configured to receive a tracking area identifier (TAI) list in a registration accept message while performing a first registration procedure with the wireless communication network, where the TAI list indicates a registration area of the wireless communication network and where the TAI list comprises a plurality of PLMN IDs.

In accordance with another aspect of the disclosure, the processor is further configured to determine when the UE is moved from a first cell in a first TAI belonging to a first PLMN to a second cell in a second TAI belonging to a second PLMN, where the second PLMN is part of the registration area.

In accordance with another aspect of the disclosure, the processor is further configured to determine that the UE is in a Radio Resource Control (RRC) inactive state, where the UE is in a 5GMM-connected mode and automatically trigger a second registration procedure with the wireless communication network in response to determining that the UE is moved from the first cell in the first TAI belonging to the first PLMN to the second cell in the second TAI belonging to the second PLMN.

In accordance with another aspect of the disclosure, the processor is further configured to initiate the second registration procedure with the wireless communication network by sending a second registration request message to the wireless communication network, where the second registration request message comprises the second PLMN identifier.

Other aspects, advantages, and salient features of the disclosure will become apparent to those skilled in the art from the following description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
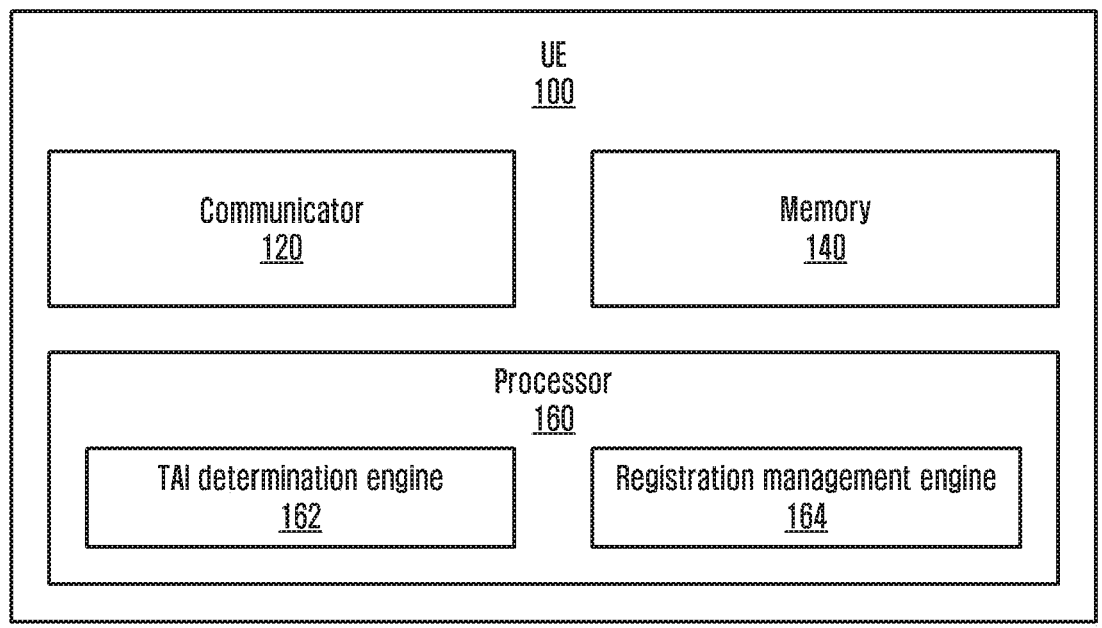
FIG. 1 illustrates a block diagram of a user equipment (UE) for triggering a second registration procedure by the UE within a registration area of a wireless communication network, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In general, with the emergence of the fifth generation (5G) communication network, wireless communication has undergone a drastic enhancement of features when compared to the existing wireless communication technologies such as fourth generation (4G) long term evolution (LTE). The 4G communication network is capable of accommodating huge user traffic with very high data rates. However, there are also some issues which have emerged in the wireless communication network which were not part of the 4G communication network. In this disclosure, the issue is introduced because of introduction of new states in the 5G communication network, called 5GMM-Connected mode with RRC_INACTIVE indication.

In general, when a UE is in a registered area, the UE is not expected to perform the registration procedure when moving across the registration area, as it is reachable from the network with paging procedure when the UE is in IDLE mode. Whenever the UE crosses the registration area, the UE is expected to perform the registration procedure, so that the UE can be reached following the paging procedure if the UE goes back to IDLE mode. Consider a scenario when a user equipment (UE) registered with the wireless communication network which is latched to a first public land mobile network (PLMN) moves and latches to a second PLMN. However, the first PLMN and the second PLMN are both part of the registered area. Hence, when the UE moves from the first PLMN to the second PLMN, the UE does not re-register with a network entity of the wireless communication network, as there is no change in MM context and the UE can be reached for paging if it goes to IDLE mode both in first and second PLMN. However, consider when the UE is in 5GMM-Connected mode RRC Inactive state. In this state network, the UE is in connected mode but only the RRC connection between a 5G NR base station (gNodeB) and the UE is not active. As a result, the network entity, the AMF, of the wireless communication network, which is in connected mode with the gNodeB, is unaware that the UE is currently latched to the second PLMN and not the first PLMN. This creates a mismatch between the UE and AMF. The UE is actually camping on the second PLMN whereas per the information with the AMF, the UE is camping on the first AMF. Further, any network entity-initiated procedures such as de-registration procedure and authentication procedure will fail due to an absence of synchronization between the UE and the network entity with respect to a selected PLMN.

Thus, it is desired to address the above-mentioned disadvantages or other shortcomings or at least provide a useful alternative.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive "or", unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for triggering a registration procedure by a UE within a registration area of a wireless communication network. The method includes receiving a TAI list indicating a current registration area of the wireless communication network and determining when the UE is moved from a first cell in a first TAI belonging to a first PLMN to a second cell in a second TAI belonging to a second PLMN. Further, the method includes determining that the UE is in an RRC inactive state and automatically triggering a registration procedure with the wireless communication network in response to determining that the UE is moved from the first cell in the first TAI belonging to the first PLMN to the second cell in the second TAI belonging to the second PLMN and registering with the wireless communication network by sending a second registration request message to the wireless communication network. In conventional methods and systems, the UE and a network entity such as an access and mobility management function (AMF) entity may be out of sync with a selected PLMN ID which results in problems during network-initiated deregistration procedure or authentication procedure.

Unlike the conventional methods and systems, the proposed method triggers a registration procedure when the UE which is in a Radio Resource Control (RRC) inactive state moves from the first PLMN to the second PLMN even though the UE is in a registration area.

Unlike the conventional methods and systems, in the proposed method the network entity is aware that the UE is currently latched to the second PLMN due to registering with the network entity again. Hence, the network-initiated deregistration procedure or authentication procedure is performed with respect to the second PLMN and the respective procedures are executed without any issues.

In the description, the terms fifth generation system (5GS) mobility management (5GMM)-CONNECTED mode with RRC inactive indication, 5GMM-CONNECTED mode with RRC inactive state and the UE is in RRC_INACTIVE state and in 5GMM-CONNECTED mode, may be used interchangeably and refer to the same state of the UE.

Referring now to the drawings and more particularly to FIGS. 1 to 7, where similar reference characters denote corresponding features consistently throughout the figure, embodiments of the disclosure are shown.

FIG. 1 illustrates a block diagram of a UE for triggering a second registration procedure by the UE within a registration area of a wireless communication network, according to an embodiment of the disclosure.

Referring to FIG. 1, a UE (100) includes a communicator, transceiver, or the like (120), a memory (140) and at least one processor (160).

In an embodiment, the communicator (120) is configured to send a registration request message to the wireless communication network for initiating a first registration procedure of the UE (100) using a first PLMN. Further, in response to the registration request message sent to the wireless communication network, the communicator (120) is configured to receive a tracking area identifier (TAI) list in a registration accept message from the wireless communication network. The TAI list indicates a registration area of the wireless communication network and the TAI list comprises a plurality of PLMN IDs.

The communicator (120) is also configured to send the registration request message to the wireless communication network to initiate the second registration procedure when the UE (100) moves from a first tracking area identity (TAI) to a second tracking area identity (TAI) within the same registration area.

In another embodiment, the communicator (120) is further configured to receive an authentication request message from the wireless communication network and also send an authentication response message to the wireless communication network on successful completion of an authentication process.

In yet another embodiment, the communicator (120) is further configured to receive a deregistration request message from the wireless communication network to deregister from the network.

In an embodiment, the memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information. In certain examples, a non-transitory storage medium may store data that can, over time, change (e.g., in Random Access Memory (RAM) or cache).

In an embodiment, the processor (160) includes a tracking area identity (TAI) determination engine (162) and a registration management engine (164).

The TAI determination engine (162) is configured to determine that the UE (100) is moved from the first TAI to the second TAI within the same registration area. The registration area is determined by the UE (100) during the last registration procedure of the UE (100) with the wireless communication network. The movement of the UE (100) from the first TAI to the second TAI is identified based on a change of the PLMN ID from the first PLMN to the second PLMN. Further, the second PLMN can be an equivalent PLMN.

In an embodiment, the first PLMN cell and second PLMN cell can be the shared network cell.

The registration management engine (164) is configured to determine that the UE (100) is in a Radio Resource Control (RRC) inactive state. In the RRC inactive state the UE (100) is in a fifth generation system (5GS) mobility management (5GMM)-connected mode. The term 5GMM-CONNECTED mode here refers to over a 3rd Generation Partnership Project (3GPP) access.

Further, the registration management engine (164) is further configured to automatically trigger a second registration procedure with the wireless communication network in response to determining that the UE (100) is moved from the first PLMN to the second PLMN. Further, the registration management engine (164) is also configured to register the UE (100) with the wireless communication network by controlling the communicator (120) to send the registration request message to the wireless communication network.

Although FIG. 1 shows hardware elements of the UE (100), it is to be understood that other embodiments are not limited thereto. In other embodiments, the UE (100) may include a different number of elements. Further, the labels or names of the elements are used for illustrative purpose only, and do not limit the scope of the disclosure. One or more components can be combined together to perform the same or substantially similar functions.

Figure 2:
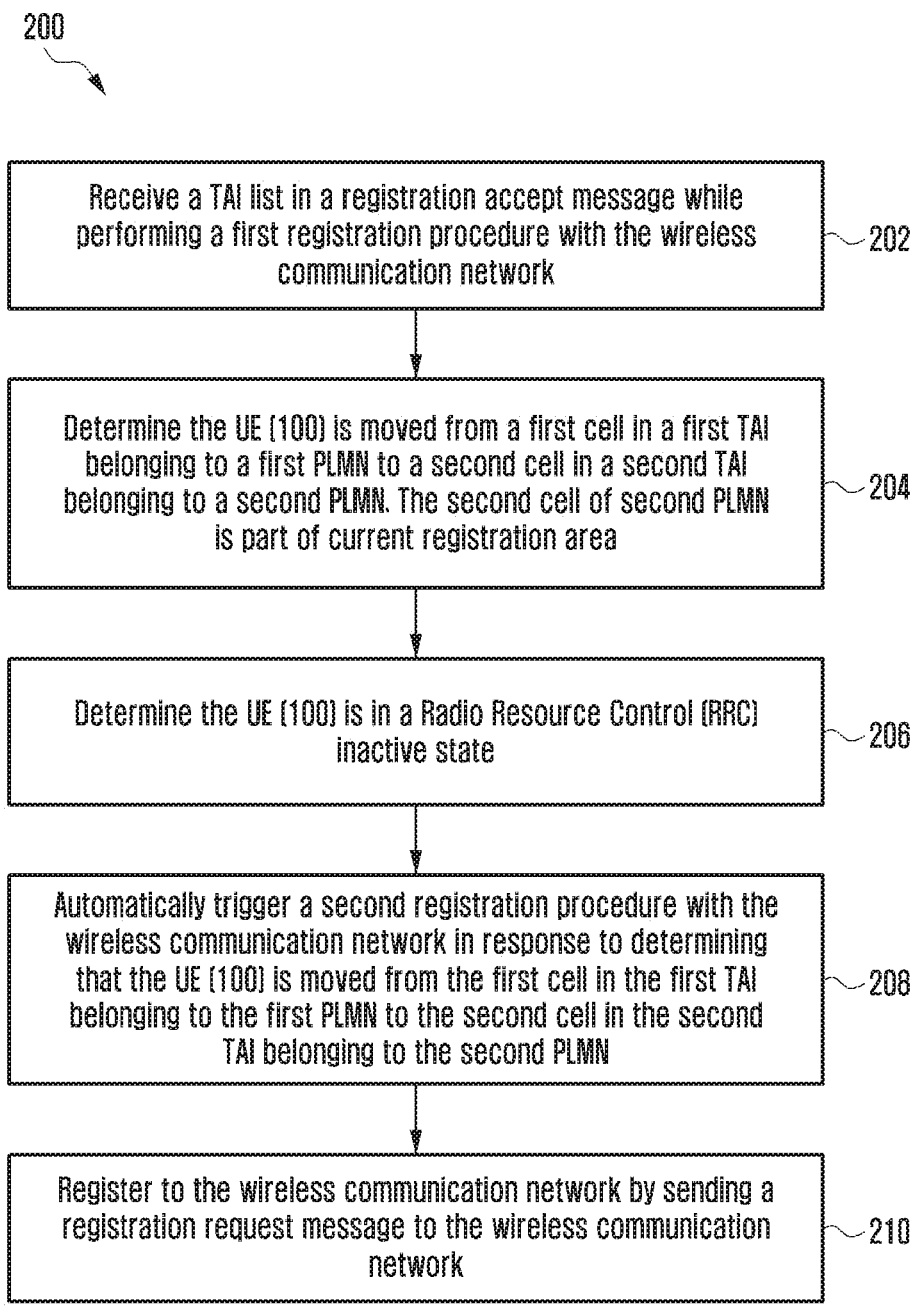
FIG. 2 illustrates a flow diagram of a method for triggering a second registration procedure by a UE within a registration area of a wireless communication network, according to an embodiment of the disclosure.

FIG. 2 illustrates a flow diagram of a method for triggering a second registration procedure by a UE within a registration area of a wireless communication network, according to an embodiment of the disclosure.

Referring to FIG. 2, at operation 202 of flow diagram 200, the UE (100) receives the TAI list in the registration accept message while performing the first registration procedure with the wireless communication network. For example, in the UE (100) as illustrated in FIG. 1, the processor (160) can be configured to receive the TAI list in the registration accept message while performing the first registration procedure with the wireless communication network.

At operation 204, the UE (100) determines that the UE (100) is moved from the first cell in the first TAI belonging to the first PLMN to the second cell in the second TAI belonging to the second PLMN. The second cell of the second PLMN is part of the current registration area. For example, in the UE (100) as illustrated in the FIG. 1, the processor (160) can be configured to determines the UE (100) is moved from the first cell in the first TAI belonging to the first PLMN to the second cell in the second TAI belonging to the second PLMN. The second PLMN is part of the current registration area.

At operation 206, the UE (100) determines that the UE (100) is in the Radio Resource Control (RRC) inactive state. For example, in the UE (100) as illustrated in FIG. 1, the processor (160) can be configured to determine that the UE (100) is in the Radio Resource Control (RRC) inactive state.

At operation 208, the UE (100) automatically triggers the second registration procedure with the wireless communication network in response to determining that the UE (100)

is moved from the first cell in the first TAI belonging to the first PLMN to the second cell in the second TAI belonging to the second PLMN. For example, in the UE (100) as illustrated in FIG. 1, the processor (160) can be configured to automatically trigger the second registration procedure with the wireless communication network in response to determining that the UE (100) is moved from the first cell in the first TAI belonging to the first PLMN to the second cell in the second TAI belonging to the second PLMN.

At operation 210, the UE (100) registers with the wireless communication network by sending the registration request message to the wireless communication network. For example, in the UE (100) as illustrated in FIG. 1, the processor (160) can be configured to register with the wireless communication network by sending the registration request message to the wireless communication network.

The various actions, acts, blocks, operations, or the like, in the method of flow diagram 200 may be performed in the order presented, in a different order, or simultaneously. Further, in some embodiments, some of the actions, acts, blocks, operations, or the like may be omitted, added, modified, skipped, combined, or the like, without departing from the scope of the disclosure.

Figure 3:
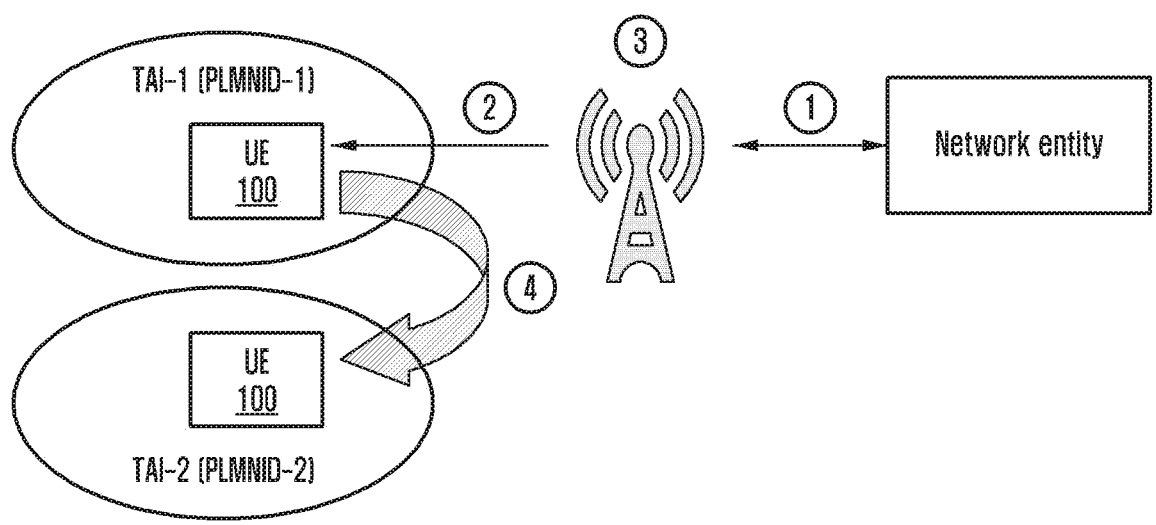
FIG. 3 illustrates a mechanism of change in public land mobile network (PLMN) on which a UE camps in a wireless communication network, according to related art.

FIG. 3 illustrates a mechanism of public land mobile network (PLMN) update by a UE in a wireless communication network, according to related art.

Referring to FIG. 3, at operation 1, consider that the UE (100) registers with a network entity such as an access and mobility management function (AMF) entity of the wireless communication network on the first PLMN referred to as PLMN ID-1 by sending a registration request message.

At operation 2, the UE (100) receives a registration accept message from the network entity which includes the first tracking area identity (TAI-1) which belongs to the PLMN ID-1 and the second tracking area identity (TAI-2) which belongs to the PLMN ID-2 as part of a TAI list. The TAI list indicates the current registration area of the wireless communication network. The TAI-1 and the TAI-2 can be cells of the shared network. When the network entity sends the registration accept message to the UE (100), the network entity identifies the UE (100) can be in any of the TAI's provided in the current registration area to the UE (100).

At operation 3, the gNodeB of the wireless communication network moves the UE (100) into the Radio Resource Control (RRC) inactive state while the UE (100) is on the TAI-1. In the RRC inactive state, the context of the UE (100) is stored in the gNodeB which enables the fast resumption with respect to the UE (100) and at the same time the gNodeB is in active connection with the AMF over the N2 interface.

At operation 4, the UE (100) moves from an area identified by the TAI-1 to another area identified by the TAI-2 and latches with the PLMN ID-2. Since the TAI-2 is part of the current registration area, the UE (100) does not trigger the registration procedure again to inform the network entity about the change in the TAI of the UE (100). However, as the registration procedure is not performed again, the network entity continues to assume that the UE (100) is located within the TAI-1 and latched to the PLMN ID-1. Thus, there is an asynchronization between the AMF and the UE (100) for the parameter PLMN ID (operator identifier) over which the UE (100) is camping. The AMF assumes that the UE (100) is on PLMN ID-1, however, the UE (100) is actually camping on PLMN ID-2.

Figure 4:
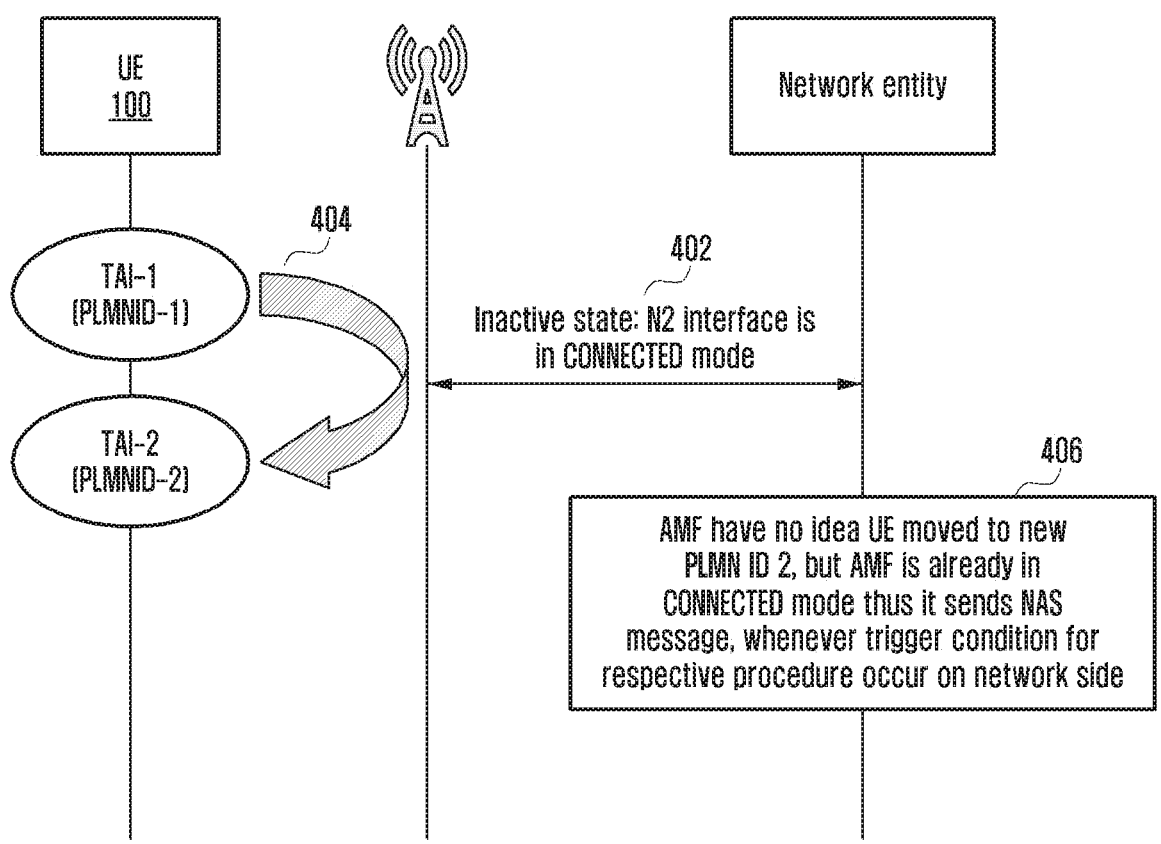
FIG. 4 is a signaling diagram illustrating a mechanism of change in a PLMN on which a UE camps in a wireless communication network and a network entity is not aware that the UE is moved to a new PLMN, according to related art.

FIG. 4 is a signaling diagram illustrating a mechanism of change in a PLMN on which a UE camps in a wireless communication network and a network entity is not aware that the UE is moved to a new PLMN according to related art.

Referring to FIG. 4, at operation 402, the UE (100) is in the 5GMM-connected mode with the Radio Resource Control (RRC) inactive state enabled by the network entity (e.g., the AMF). In the RRC inactive state, an N2 interface is in the CONNECTED mode. The N2 interface is established between the Security Anchor Function (SEAF) entity/AMF and the gNodeB or a non-3GPP Interworking Function (N3IWF).

At operation 404, the UE (100) moves from the area indicated by the TAI-1 to the area indicated by the TAI-2 which results in the change of the PLMN to which the UE (100) is latched i.e., the UE (100) deregisters from the PLMN ID-1 and latches to the PLMN ID-2.

At operation 406, the AMF is, however, not aware that the UE (100) has moved from the PLMN ID-1 and latched to the PLMN ID-2. Thus, there is an asynchronization between the AMF and the UE (100) for the parameter PLMN ID (operator identifier) over which the UE (100) is camping. The AMF assumes that the UE (100) is latched on the PLMN ID-1, however, the UE (100) is actually camping on the PLMN ID-2. Thus, the AMF sends the NAS message whenever the trigger condition for the respective procedure occurs at the network entity.

Figure 5:
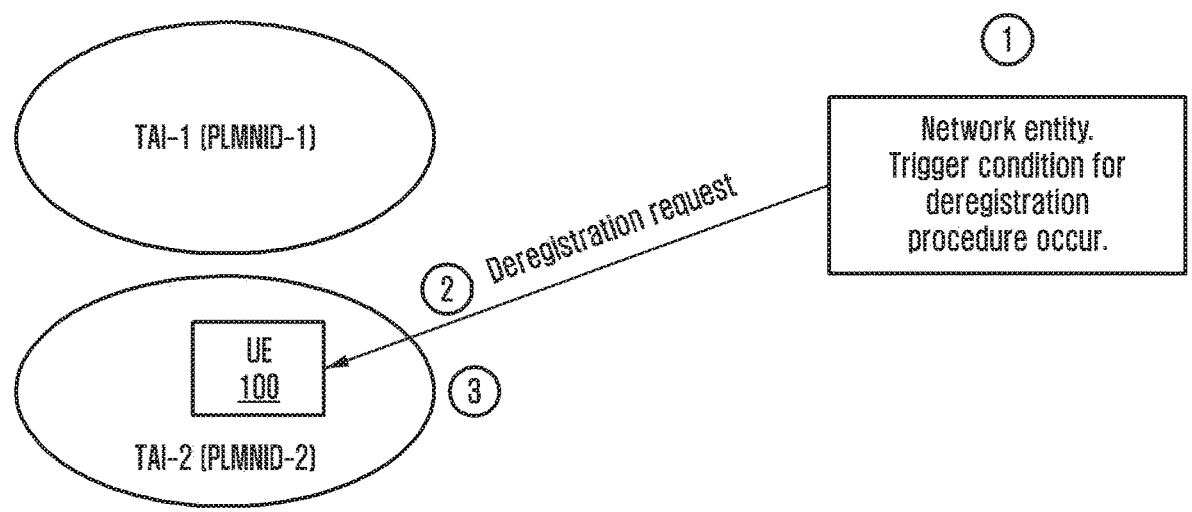
FIG. 5 illustrates a deregistration procedure between a UE and a network entity in a wireless communication network, according to related art.

FIG. 5 illustrates a deregistration procedure between a UE and a network entity in a wireless communication network, according to related art.

Referring to FIG. 5, in conjunction with FIGS. 3 and 4, in continuation to the movement of the UE (100) from the TAI-1 to the TAI-2, the AMF is, however, not aware that the UE (100) has moved from the PLMN ID-1 and latched to the PLMN ID-2. Thus, there is an asynchronization between the AMF and the UE (100) for the parameter PLMN ID (operator identifier) over which the UE (100) is camping. The AMF assumes that the UE (100) is on the PLMN ID-1, however the UE (100) is actually camping on the PLMN ID-2. In an example scenario, at operation 1, the network entity initiates the deregistration procedure in the wireless communication network to inform the UE (100) to avoid using services from the PLMN ID-1. The deregistration procedure may be initiated to conditions at the wireless communication network such as, for example, end of a subscription, etc. when the trigger condition for the deregistration procedure occurs.

Further, at operation 2, the network entity sends the deregistration request message to the UE (100) to deregister from the PLMN ID-1 with cause #11 PLMN NOT ALLOWED indicated in the deregistration request message. The cause #11 PLMN NOT ALLOWED indicated in the deregistration request message by the network entity does not specify which PLMN needs to be deregistered and implicitly assumes that the cause #11 PLMN NOT ALLOWED is for the PLMN to which the UE (100) was latched. However, the UE (100) is located in the TAI-2 and latched to the PLMN ID-2 which is not known to the network entity, since there is no indication/registration request sent by the UE (100) to indicate the movement of the UE (100) from the TAI-1 to the TAI-2.

At operation 3, the network entity wants to forbid the use of the PLMN-ID1 for the UE (100), but the UE (100) will populate the PLMN ID 2 in the forbidden PLMN list since the cause #11 PLMN NOT ALLOWED is for the PLMN to which the UE (100) is currently latched. Hence, the UE (100) will never try to get service on the PLMN ID-2. Further, the UE (100) will perform the selection of the PLMN and will not select a cell of the PLMN ID-2.

However, in case the PLMN ID-2 is the only PLMN which was providing service in a given area, then the UE (100) will be in NO SERVICE permanently due to the state mismatch between the UE (100) and the network entity in the interpretation of the PLMN associated with the UE (100).

Figure 6:
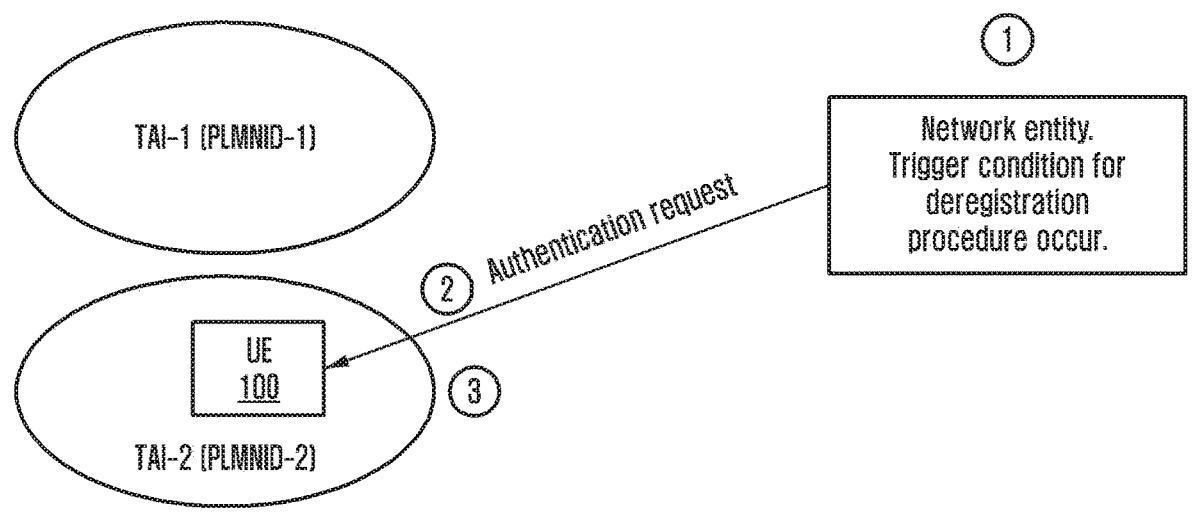
FIG. 6 illustrates an authentication procedure between a UE and a network entity in a wireless communication network, according to related art.

FIG. 6 illustrates an authentication procedure between a UE and a network entity in a wireless communication network, according to related art.

Referring to FIG. 6, in conjunction with FIG. 3, in continuation to the movement of the UE (100) from the TAI-1 to the TAI-2 in an example scenario, at operation 1, the network entity initiates a periodic authentication procedure with the UE (100) in the context of the PLMN ID-1.

At operation 2, the network entity sends an authentication request message to the UE (100) to perform the authentication procedure. The authentication request message includes the first set of authentication parameters which are provided by the network entity. However, the first set of authentication parameters are related to the PLMN ID-1 since the network entity is not aware that the UE (100) is moved from the TAI-1 to the TAI-2.

At operation 3, the UE (100) in response to receiving the authentication request message computes the second set of authentication parameters based on the PLMN to which the UE (100) is latched i.e., the PLMN ID-2. Further, the first set of authentication parameters and the second set of authentication parameters do not match, as the UE (100) uses the PLMN ID-2 whereas the network entity uses the PLMN ID-1. Thus, the authentication procedure fails at both the UE (100) and the network entity.

Figure 7:
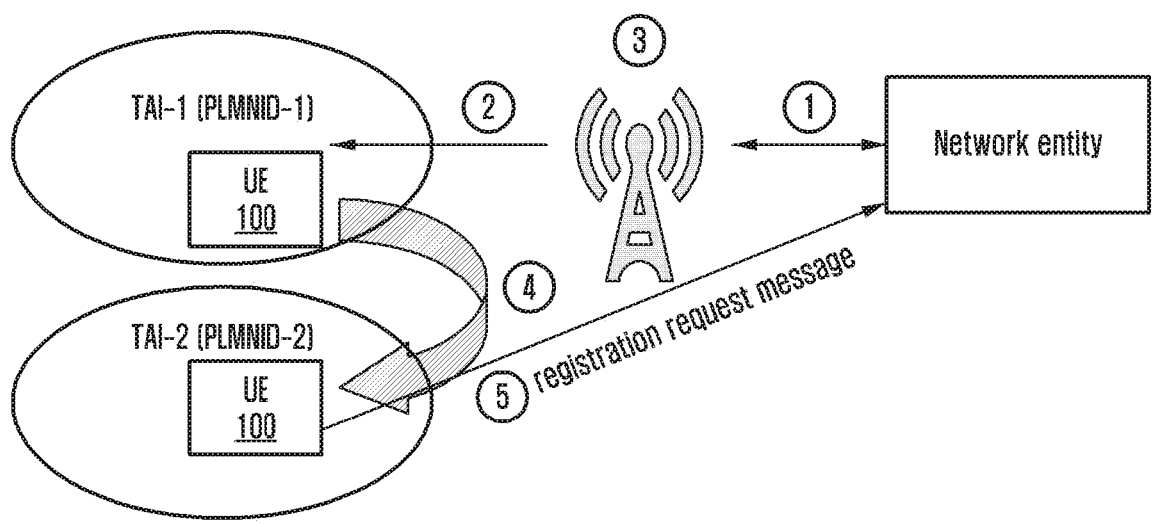
FIG. 7 illustrates a mechanism for triggering a second registration procedure by a UE within a current registration area when there is a change in a PLMN on which the UE camps in a wireless communication network, according to an embodiment of the disclosure.

FIG. 7 illustrates a mechanism for triggering of a second registration procedure by a UE within a current registration area when there is a change in a PLMN on which the UE camps in a wireless communication network, according to an embodiment of the disclosure.

Referring to FIG. 7, at operation 1, consider that the UE (100) registers with the network entity such as the AMF entity of the wireless communication network on the first PLMN referred to as the PLMN ID-1 by sending the registration request message.

At operation 2, the UE (100) receives the registration accept message from the network entity which includes the TAI-1 which belongs to the PLMN ID-1 and the TAI-2 which belongs to the PLMN ID-2 as part of the TAI list. The TAI list indicates the current registration area of the wireless communication network. The TAI-1 and the TAI-2 can be cells of the shared network. When the network entity sends the registration accept message to the UE (100), the network entity identifies the UE (100) can be in any of the TAI's provided in the current registration area to the UE (100).

At operation 3, the gNodeB of the wireless communication network moves the UE (100) into the Radio Resource Control (RRC) inactive state while the UE (100) is on the TAI-1. In the RRC inactive state, the context of the UE (100) is stored in the gNodeB which enables the fast resumption with respect to the UE (100) and at the same time gNodeB is in active connection with the AMF over the N2 interface.

At operation 4, the UE (100) moves from the area identified by the TAI-1 to another area identified by the TAI-2 and latches with the PLMN ID-2, in the RRC inactive state.

At operation 5, in response to determining that the TAI is changed from the TAI-1 to the TAI-2, the UE (100) automatically triggers the second registration procedure with the network entity by sending the second registration request message to the network entity, even though the UE (100) is part of the same registration area. Hence, the network entity is aware that the UE (100) is latched to the PLMN ID-2 and not the PLMN ID-1 and hence, any future procedures to be initiated by the network entity should be with respect to the PLMN ID-2.

Unlike conventional methods and systems, in the method according to an embodiment of the disclosure, the UE (100) automatically triggers the second registration procedure with the network entity even when the UE (100) has moved from one cell to another cell within the current registration area. Therefore, due to the second registration procedure initiated by the UE (100), the network entity becomes aware that the UE (100) is latched to the PLMN ID-2 and not the PLMN ID-1 and hence, any future procedures to be initiated by the network entity should be with respect to the PLMN ID-2 and not the PLMN ID-1.

Figure 8:
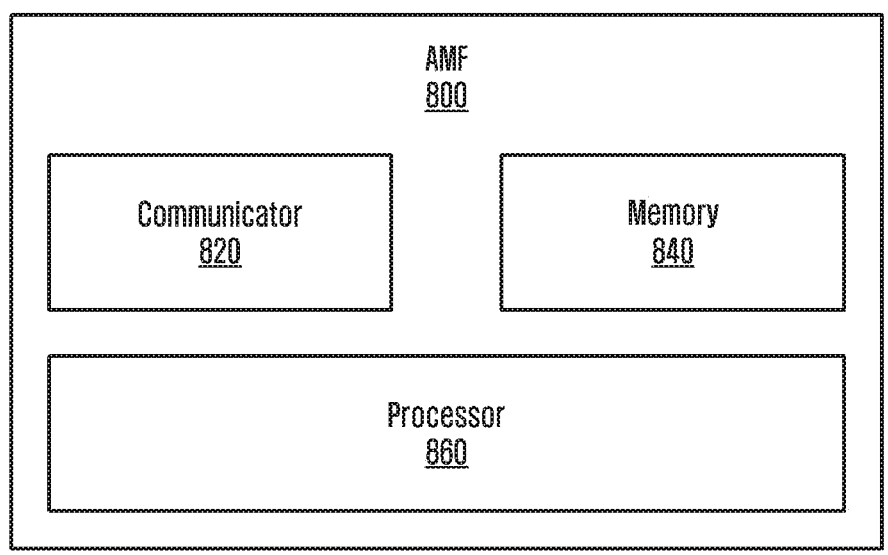
FIG. 8 illustrates a block diagram of an access management function (AMF), according to an embodiment of the disclosure.

FIG. 8 illustrates a block diagram of a network node performing an access management function (AMF), according to an embodiment of the disclosure.

Referring to FIG. 8, an AMF (800) may include a communicator, transceiver, or the like (820), a processor (860), and a memory (840). In the disclosure, the processor (860) may be defined as a circuit or application-specific integrated circuit or at least one processor.

The communicator (820) may transmit/receive signals to/from another network entity and/or a terminal. The communicator (820) may transmit, for example, a registration accept message and may receive a registration request message.

The processor (860) may control the overall operations of the AMF according to an embodiment of the disclosure. For example, the processor (860) may control operations, such as communication with a terminal for a registration procedure.

The memory (850) may store at least one of information transmitted/received through the communicator (820) and information generated through the processor (860).

The embodiments disclosed herein can be implemented through at least one software program running on at least one hardware device and performing network management functions to control the elements. The elements shown in FIGS. 1 to 8 include blocks, elements, actions, acts, operations, or the like, which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the general concept and, therefore, such adaptations and modifications should be and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by a terminal in a wireless communication system, the method comprising:

transmitting, to an access and mobility management function (AMF) entity, a first registration request message of a first registration procedure;

receiving, from the AMF entity, a registration accept message in response to the first registration request message, the registration accept message including a first tracking area identifier (TAI) list and a second TAI list for a registration area;

identifying, while in a radio resource control (RRC) inactive state, that the terminal moves from a first cell belonging to the first TAI list of a first public land mobile network (PLMN) which is a registered PLMN to a second cell belonging to the second TAI list of a second PLMN in the registration area; and initiating a second registration procedure by transmitting, to the AMF entity, a second registration request message based on a result of the identification.

2. The method of claim 1, wherein the second cell in the registration area is a shared network cell.

3. The method of claim 1, wherein the identifying further comprises identifying that the terminal is in a 5G mobility management connected (5GMM-CONNECTED) mode with the RRC inactive state.

4. The method of claim 1,
wherein the first registration request message and the registration accept message are for the first registration procedure with the AMF entity, and
wherein the second registration request message is for the second registration procedure with the AMF entity.

5. The method of claim 1, wherein the first PLMN and the second PLMN are in an equivalent PLMN list configured for the registration area.

6. A method performed by an access and mobility management function (AMF) entity in a wireless communication system, the method comprising:
receiving, from a terminal, a first registration request message of a first registration procedure;
transmitting, to the terminal, a registration accept message in response to the first registration request message, the registration accept message including a first tracking area identifier (TAI) list and a second TAI list for a registration area; and
receiving, from the terminal, a second registration request message of a second registration procedure, in case that the terminal in a radio resource control (RRC) inactive state moves from a first cell belonging to the first TAI list of a first public land mobile network (PLMN) which is a registered PLMN to a second cell belonging to the second TAI list of a second PLMN in the registration area.

7. The method of claim 6, wherein the second cell in the registration area is a shared network cell.

8. The method of claim 6, wherein the second registration request message is received in case that the terminal in a 5G mobility management connected (5GMM-CONNECTED) mode with the RRC inactive state.

9. The method of claim 6,
wherein the first registration request message and the registration accept message are for the first registration procedure with the terminal, and
wherein the second registration request message is for the second registration procedure with the terminal.

10. The method of claim 6, wherein the first PLMN and the second PLMN are in an equivalent PLMN list configured for the registration area.

11. A terminal in a wireless communication system, the terminal comprising:
a transceiver configured to transmit or receive a signal; and
at least one processor configured to:

transmit, to an access and mobility management function (AMF) entity, a first registration request message of a first registration procedure,
receive, from the AMF entity, a registration accept message in response to the first registration request message, the registration accept message including a first tracking area identifier (TAI) list and a second TAI list for a registration area,
identify, while in a radio resource control (RRC) inactive state, that the terminal moves from a first cell belonging to the first TAI list of a first public land mobile network (PLMN) which is a registered PLMN to a second cell belonging to the second TAI list of a second PLMN in the registration area, and
initiate a second registration procedure by transmitting, to the AMF entity, a second registration request message based on a result of the identification.

12. The terminal of claim 11, wherein the second cell in the registration area is a shared network cell.

13. The terminal of claim 11, wherein the at least one processor is further configured to identify that the terminal is in a 5G mobility management connected (5GMM-CONNECTED) mode with the RRC inactive state.

14. The terminal of claim 11,
wherein the first registration request message and the registration accept message are for the first registration procedure with the AMF entity, and
wherein the second registration request message is for the second registration procedure with the AMF entity.

15. The terminal of claim 11, wherein the first PLMN and the second PLMN are in an equivalent PLMN list configured for the registration area.

16. An access and mobility management function (AMF) entity in a wireless communication system, the AMF entity comprising:
a transceiver configured to transmit or receive a signal; and
at least one processor configured to:
receive, from a terminal, a first registration request message of a first registration procedure,
transmit, to the terminal, a registration accept message in response to the first registration request message, the registration accept message including a first tracking area identifier (TAI) list and a second TAI list for a registration area, and
receive, from the terminal, a second registration request message of a second registration procedure, in case that the terminal in a radio resource control (RRC) inactive state moves from a first cell belonging to the first TAI list of a first public land mobile network (PLMN) which is a registered PLMN to a second cell belonging to the second TAI list of a second PLMN in the registration area.

17. The AMF entity of claim 16, wherein the second cell in the registration area is a shared network cell.

18. The AMF entity of claim 16, wherein the second registration request message is received in case that the terminal in a 5G mobility management connected (5GMM-CONNECTED) mode with the RRC inactive state.

19. The AMF entity of claim 16,
wherein first registration request message and the registration accept message are for the first registration procedure with the terminal, and
wherein the second registration request message is for the second registration procedure with the terminal.

20. The AMF entity of claim 16, wherein the first PLMN and the second PLMN are in an equivalent PLMN list configured for the registration area.

* * * * *